(No Model.)
J. F. MARTIN.
CONDUIT FOR ELECTRIC WIRES.
No. 286,940. Patented Oct. 16, 1883.
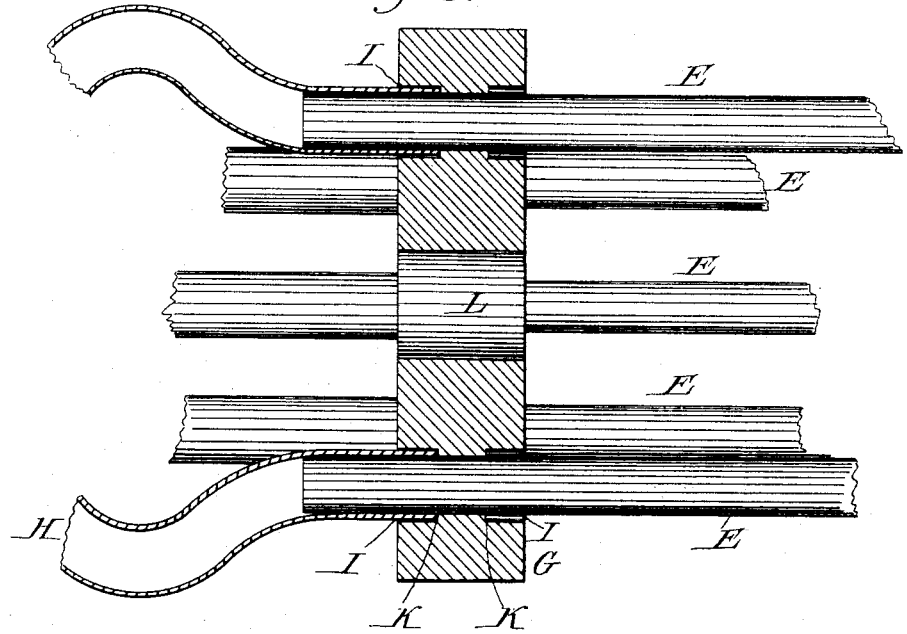
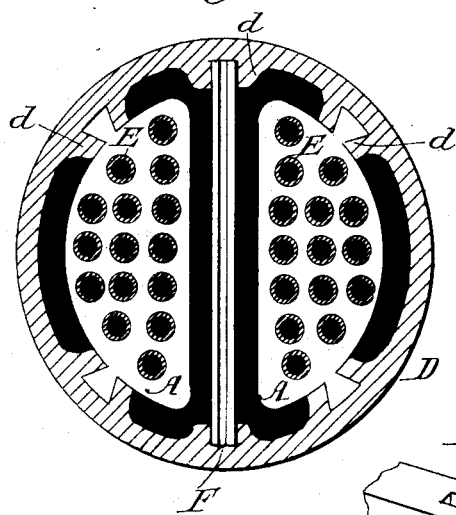
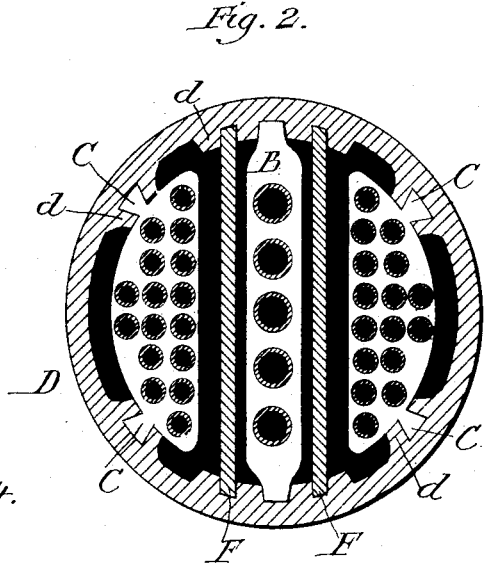
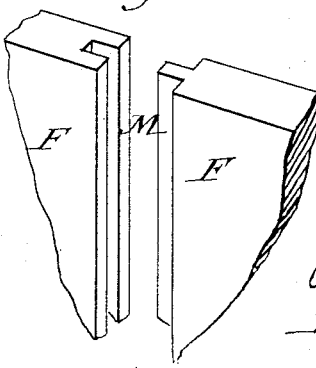
Witnesses
Frank J. Blanchard
Will R. Omohundro
Inventor:
John F. Martin
By Jno. G. Elliott
Attorney.

UNITED STATES PATENT OFFICE.

JOHN F. MARTIN, OF CHICAGO, ILLINOIS.

CONDUIT FOR ELECTRIC WIRES.

SPECIFICATION forming part of Letters Patent No. 286,940, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Conduits for Electric Wires, of which the following is a specification.

This invention relates to conduits for electric wires in which insulating-tubes for the wires are laid within the conduit.

The object of my invention is twofold: first, to provide improved means for supporting and separating the wires, according to their several uses, into distinct classes within the conduit, whereby telephone-wires, for example, can be separated from the wires for telegraph purposes, and these two sets of wires in turn separated from the wires employed for electric lighting. By thus separating and supporting the wires, induction is prevented, the laying or taking out of the wires facilitated, and electric wires for various purposes all readily laid within one conduit without confusing the wires. A further object is to provide means for forming a tight joint between the insulating-tubes that are inclosed by and supported within the conduit and certain flexible insulating-tubes that are employed at such points as it is required to carry or branch off wires from the main conduit to branch pipes or distributers. The first of the said main objects I attain by providing at any desired point or points in the conduit a transverse partition composed of perforated plates or disk-sections, which are fitted within the conduit-pipe so as to stand in the same or substantially one and the same plane with each other, and separated from each other, as hereinafter described, the insulating-tubes for the wires being fitted in the perforations of these said supports. By such means sets of insulating-tubes for different sets of wires can be respectively arranged in the perforated supports, and hence the various sets of wires which have been laid within the insulating-tubes separated from each other and readily distinguished. The second main object I attain by providing a perforated disk for supporting the insulating-tubes within the conduit at a point at or near the terminus of said tubes, and by enlarging a portion of any or all of the passages through said disk, so as to allow the ends of the flexible tubes which are fitted upon the straight tubes to be inserted to some extent in the disk, and also pushed back against shoulders formed within the openings or passages.

In the annexed drawings, in which my said improvements are clearly illustrated, Figure 1 represents a section taken transversely through a conduit-pipe with the insulating-tubes fitted in perforated supports arranged within the pipe and separated from each other in accordance with my invention. Fig. 2 is a view similar to Fig. 1, but with provision made for an additional set of tubes and wires. Fig. 3 is an enlarged sectional view taken through a perforated disk in which the ends of the insulating-tubes are supported and connected with flexible insulating-tubes by tight joints. Fig. 4 is a perspective view of the meeting ends of two partitions adapted to be fitted within the conduit.

The letter A refers to two of the perforated plates or supports that I employ for the insulating-tubes in which the wires are laid, and B indicates a third perforated plate or support, which I propose employing in case a third set of wires are to be carried through the conduit, as will be more fully explained further on. The supports A are each preferably made in the form of a segment of a disk, and connected with the inner wall of the conduit-pipe by means of the dovetail connections C, whereby said segments are supported and steadied in a vertical plane or planes within the main pipe. The perforated supporting-plate B can be held within the pipe in the same way; or, as herein shown, it can be formed with tapered ends, which are fitted within any ordinary form of mortise in the pipe.

The pipe D, which is made of asphaltum or of terra-cotta, although any other suitable material can be employed, is formed with an internal series of longitudinal ribs, *d*, in which mortises for the dovetails or projections of the perforated supports are formed. These ribs and mortises can be made to extend from end to end of each section of the conduit-pipe, if desired, so that a support can be introduced at either end of the pipe-section and its dovetails, or ends fitted in the mortises, after which the support or supports can be pushed onto the middle of the pipe-section, in order to support the tubes and wires at such point. Each one of these supports will be provided with as many perforations for insulating-tubes E as may be required for the wires to be laid.

In Fig. 1 the set of tubes in one support can be used for supporting one set of wires—as, for example, the wires used for telephones—while the tubes in the remaining support can be employed for telegraph-wires. These sets of wires are further separated by means of a partition, F, consisting, in the present instance, of a partition board or boards arranged longitudinally within the pipe, and fitted at two of its side edges in grooves formed in the internal ribs or projections, d, of the pipe.

In Fig. 2 the segmental supports are separated both from each other and from a third perforated support, B, by means of partitions F, similar to the one shown in the preceding figure, two of these partitions being, however, employed in this instance, so that a partition can be located between the central support and each one of the side supports.

The central supports, B, are shown provided with tubes of a greater diameter than the tubes in the side supports, and hence said central set of tubes will be best adapted for wires for electric lights.

The partitions F, which are made of wood, paper, terra-cotta, asphaltum, or other insulating materials, can be extended from end to end of the pipe-section, so that the several sets of wires shall be separated throughout the entire length of the conduit, which is composed of pipe-sections provided with the said appendages. Under this arrangement, spaces are left between the supports and the partitions, and also between the side supports and the walls of the pipe, whereby provision is made for a free circulation of air through the pipe in the event of means being employed for inducing a current of air through the same in order to keep the insulating-tubes dry. It will be seen that the tubes can first be fitted in these supports, and the latter then introduced into the conduit-pipe, and that by reason of the dovetail or tongue-and-groove connections between the supports and pipe the supports will be prevented from turning, and thereby twisting of the tubes prevented.

G indicates a disk which is made of wood, paper, terra-cotta, asphaltum, or other insulating material, and provided with perforations for the insulating-tubes.

The flexible insulating-tubes H, which are required for such wires as are to be bent at certain points along the line, are fitted upon the ends of the tubes E, which pass through and project to some extent out from one side of the disk. The holes formed by these perforations are enlarged for a portion of their length, as at I, so as to provide shoulders K, against which the ends of the flexible tubes will abut after the latter have been fitted upon the tubes E and pushed back into the enlarged portions of the holes through the disk. This supporting-disk can be located at any break or bend on the line, and will be provided with a central opening, L, through which induced currents of air can pass. In the drawings part of the tubes E are represented as being carried straight on, while others terminate just beyond the support and connect with the flexible tubes.

Two or more sets of supports, A B, can be connected by rods or bars when desired, so as to facilitate their introduction into the conduit-pipe.

From the foregoing it will be seen that a set of these perforated plates, located at some suitable point in the conduit, serves to support the tubular insulators at such point, and also to enable different kinds of wires to be separately grouped, and further to allow any induced currents of air to pass freely through the conduit. The perforated plates of a set are in one and the same or substantially one and the same plane, so as to constitute a transverse partition arranged at right angles to the pipe in which they are fitted; but as the said plates are separate from each other, any one of them can be taken out without disturbing the others.

Having thus described my invention, what I claim, and desire to secure by Letters Patent, is—

1. As a means for supporting electric wires within a conduit, a transverse portion removably fitted within the conduit, and composed of two or more perforated plates arranged in substantially one and the same plane with each other, and separated, substantially as and for the purpose described.

2. The combination, with a conduit, of transverse partitions, each composed of two or more parts, with intermediate air-spaces, said partitions being provided with distinct perforations for receiving wire-insulators, substantially as described.

3. The combination, with a conduit-pipe having internal longitudinal grooves, of a transverse support formed with perforations for insulating-tubes or insulated wires, and provided with projections which are adapted to fit in the said grooves within the pipe, substantially as described.

4. The combination, with the conduit-pipe provided with internal ribs having mortises formed therein, of the supports for the insulating-tubes, provided with projections which are received in the said mortises, substantially as described.

5. The combination, with the perforated supports for insulating-tubes, located transversely within a conduit-pipe, and each composed of two or more perforated plates, of one or more removable longitudinal partitions fitted within the pipe between said supports, substantially as described.

6. The perforated supporting-disk adapted to fit in a conduit-pipe, and having shoulders formed in its openings, through which the straight insulating-tubes pass, whereby flexible tubes can be fitted upon said straight tubes and pushed back to the shoulders in order to constitute a tight joint, substantially as described.

7. The combination of the conduit with two or more perforated supports detachably connected by dovetail or equivalent connections with the inner wall of the pipe, insulating-tubes fitted within the perforations of the said supports, and a partition or partitions located between these supports, substantially as described.

8. The combination, with the pipe-sections of a conduit provided with longitudinal grooves, of the perforated supports, each composed of separate pieces, and the longitudinal partitions fitted within said grooves, and detachably connected together at their ends, substantially as described.

JOHN F. MARTIN.

Witnesses:
W. W. ELLIOTT,
JNO. G. ELLIOTT.